United States Patent
Miyamoto

(10) Patent No.: US 9,865,079 B2
(45) Date of Patent: Jan. 9, 2018

(54) VIRTUAL ENDOSCOPIC IMAGE GENERATED USING AN OPACITY CURVE

(75) Inventor: Masaki Miyamoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 409 days.

(21) Appl. No.: 13/017,302

(22) Filed: Jan. 31, 2011

(65) Prior Publication Data

US 2011/0242097 A1 Oct. 6, 2011

(30) Foreign Application Priority Data

Mar. 31, 2010 (JP) .................................. 2010-083112

(51) Int. Cl.
*G06T 15/00* (2011.01)
*G06T 15/08* (2011.01)
*G06T 15/20* (2011.01)

(52) U.S. Cl.
CPC .............. *G06T 15/08* (2013.01); *G06T 15/20* (2013.01)

(58) Field of Classification Search
None
See application file for complete search history.

(56) References Cited

U.S. PATENT DOCUMENTS

| | | | | |
|---|---|---|---|---|
| 5,557,711 A | * | 9/1996 | Malzbender | 345/422 |
| 5,571,114 A | * | 11/1996 | Devanaboyina | 606/108 |
| 5,581,671 A | * | 12/1996 | Goto et al. | 345/419 |
| 5,611,025 A | * | 3/1997 | Lorensen et al. | 345/419 |
| 5,782,762 A | * | 7/1998 | Vining | 600/407 |
| 5,883,933 A | * | 3/1999 | Goto et al. | 378/62 |
| 5,920,319 A | * | 7/1999 | Vining et al. | 345/420 |

(Continued)

FOREIGN PATENT DOCUMENTS

CN 1875381 A 12/2006
JP 10-507954 8/1998
(Continued)

OTHER PUBLICATIONS

Chinese Office Action dated Aug. 28, 2014; Patent Publication No. 201110033686.0.
(Continued)

*Primary Examiner* — Barry Drennan
*Assistant Examiner* — Jason Pringle-Parker
(74) *Attorney, Agent, or Firm* — Young & Thompson

(57) ABSTRACT

In generating a virtual endoscopic image, an interior of a lumen is made viewable even when the viewpoint position is changed. A virtual endoscopic image generation element generates a virtual endoscopic image by volume rendering based on three-dimensional data. An opacity curve setting element sets an opacity curve which defines the relationship between pixel values of the three-dimensional data and opacity values. A viewpoint position setting element sets a viewpoint position of a virtual endoscopic image. A movement amount determination element determines a movement amount of the opacity curve with respect to an opacity curve at a reference viewpoint position. When a virtual endoscopic image is generated by the virtual endoscopic image generation element, the opacity curve setting element sets an opacity curve obtained by moving the opacity curve by the determined movement amount in the virtual endoscopic image generation element.

20 Claims, 14 Drawing Sheets

(56) References Cited

U.S. PATENT DOCUMENTS

| | | | |
|---|---|---|---|
| 6,083,162 A * | 7/2000 | Vining | 600/407 |
| 6,272,366 B1 * | 8/2001 | Vining | 600/407 |
| 6,278,459 B1 * | 8/2001 | Malzbender et al. | 345/424 |
| 6,366,800 B1 * | 4/2002 | Vining et al. | 600/425 |
| 6,909,913 B2 | 6/2005 | Vining | |
| 7,087,088 B2 * | 8/2006 | Berg et al. | 623/23.64 |
| 7,167,180 B1 * | 1/2007 | Shibolet | 345/474 |
| 7,369,691 B2 | 5/2008 | Kondo et al. | |
| 7,486,811 B2 * | 2/2009 | Kaufman et al. | 382/128 |
| 7,706,600 B2 * | 4/2010 | Kreeger et al. | 382/154 |
| 7,747,055 B1 * | 6/2010 | Vining et al. | 382/131 |
| 8,145,292 B2 | 3/2012 | Vining | |
| 8,416,239 B2 * | 4/2013 | Miyamoto | 345/424 |
| 2001/0055016 A1 * | 12/2001 | Krishnan | 345/424 |
| 2003/0152897 A1 * | 8/2003 | Geiger | 434/262 |
| 2004/0015070 A1 * | 1/2004 | Liang et al. | 600/407 |
| 2004/0259065 A1 * | 12/2004 | Geiger | 434/272 |
| 2005/0024724 A1 * | 2/2005 | Kim et al. | 359/462 |
| 2005/0116957 A1 | 6/2005 | Guang | |
| 2005/0119550 A1 * | 6/2005 | Serra et al. | 600/407 |
| 2005/0143654 A1 * | 6/2005 | Zuiderveld et al. | 600/443 |
| 2005/0148848 A1 | 7/2005 | Guang | |
| 2005/0152588 A1 * | 7/2005 | Yoshida et al. | 382/128 |
| 2005/0169507 A1 * | 8/2005 | Kreeger et al. | 382/128 |
| 2005/0197558 A1 * | 9/2005 | Williams et al. | 600/407 |
| 2005/0272999 A1 * | 12/2005 | Guendel | 600/410 |
| 2006/0002626 A1 * | 1/2006 | Matsumoto | 382/276 |
| 2006/0229513 A1 * | 10/2006 | Wakai | 600/407 |
| 2006/0235671 A1 * | 10/2006 | Kirchberg et al. | 703/11 |
| 2006/0241745 A1 * | 10/2006 | Solem | 623/2.18 |
| 2006/0262969 A1 | 11/2006 | Matsumoto | |
| 2007/0129631 A1 * | 6/2007 | Ma et al. | 600/437 |
| 2007/0161854 A1 * | 7/2007 | Alamaro et al. | 600/109 |
| 2007/0165026 A1 * | 7/2007 | Engel | 345/424 |
| 2007/0195087 A1 * | 8/2007 | Acosta et al. | 345/424 |
| 2008/0195224 A1 * | 8/2008 | Teitelbaum et al. | 623/23.64 |
| 2008/0259282 A1 * | 10/2008 | Masumoto et al. | 353/7 |
| 2008/0297508 A1 * | 12/2008 | Schwarzer et al. | 345/424 |
| 2008/0297509 A1 * | 12/2008 | Matsumoto | 345/424 |
| 2009/0012390 A1 * | 1/2009 | Pescatore et al. | 600/425 |
| 2009/0048482 A1 * | 2/2009 | Hong et al. | 600/103 |
| 2009/0063118 A1 * | 3/2009 | Dachille et al. | 703/11 |
| 2009/0103793 A1 * | 4/2009 | Borland et al. | 382/131 |
| 2009/0189889 A1 * | 7/2009 | Engel et al. | 345/419 |
| 2009/0256838 A1 | 10/2009 | De Bliek et al. | |
| 2010/0134491 A1 * | 6/2010 | Borland et al. | 345/424 |
| 2010/0246957 A1 * | 9/2010 | Visser | 382/173 |

FOREIGN PATENT DOCUMENTS

| | | |
|---|---|---|
| JP | 2004-283373 | 10/2004 |
| JP | 2006-323653 | 11/2006 |
| JP | 2009-545360 | 12/2009 |

OTHER PUBLICATIONS

European Search Report dated Mar. 20, 2017 in corresponding European Patent Application No. 11152242.1.

"Special Session on Thoracic CAD", International Journal of Computer Assisted Radiology and Surgery; A Journal for Interdisciplinary Research, Development and Applications of Image Guided Diagnosis and Therapy, Springer, Berlin, DE, vol. 1, No. 7, Jun. 7, 2006, pp. 345-367, XP019416261, ISSN: 1861-6429, DOI: 10.1007/S11548-006-0029-5.

Japanese Office Action dated Jul. 16, 2013 in corresponding Japanese Patent Application No. 2010-083112 with partial English translation of Japanese Office Action.

* cited by examiner

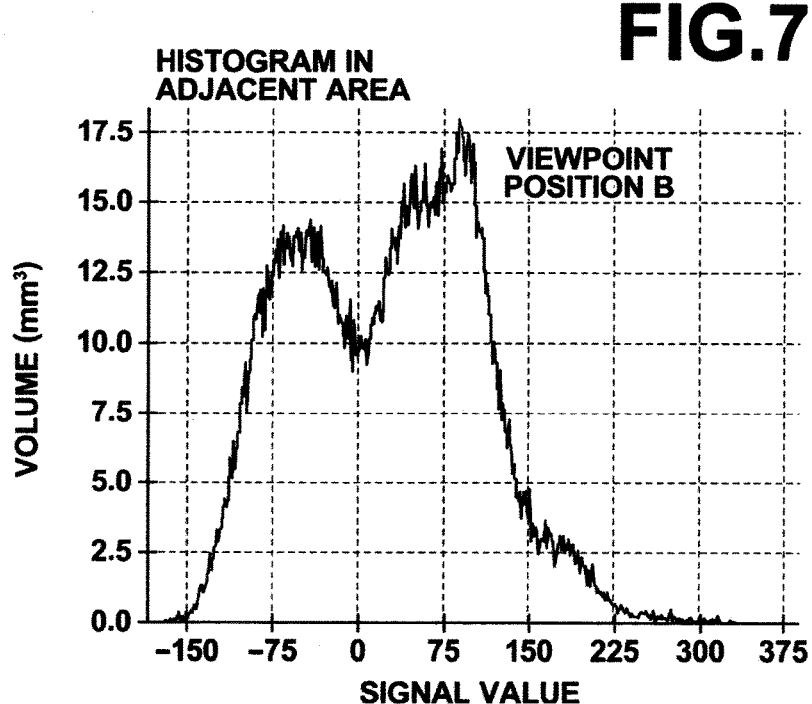
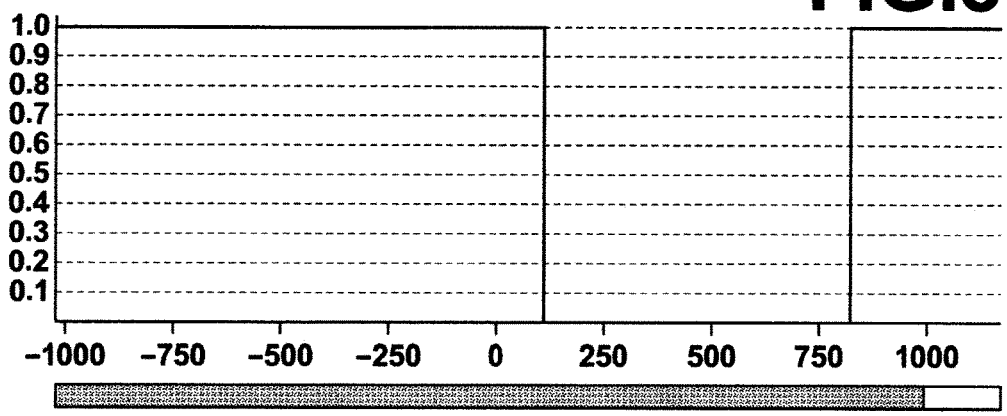

25mm

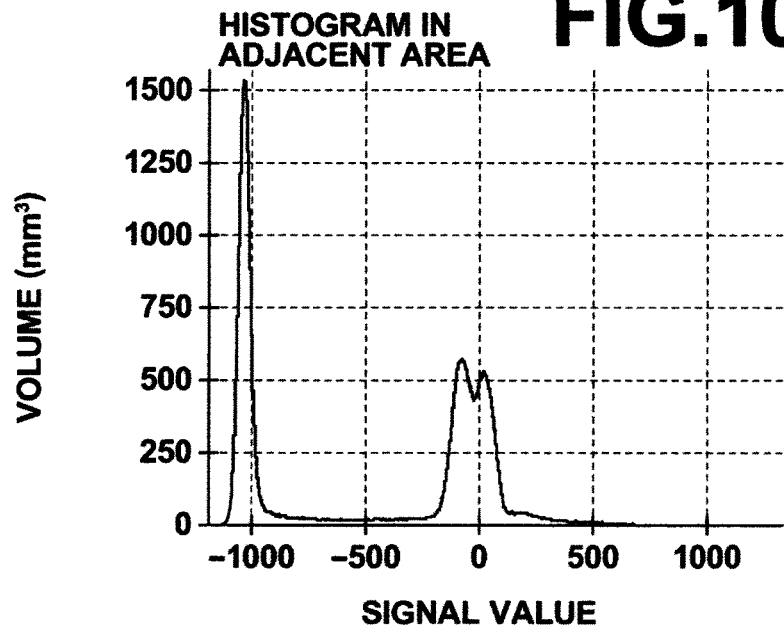

25mm

HISTOGRAM IN ADJACENT AREA

| VOLUME (mm³) | AVERAGE VALUE | STANDARD DEVIATION | MAXIMUM VALUE | MINIMUM VALUE |
|---|---|---|---|---|
| 221992.97 | −654.455 | 482.479 | 776.000 | −1121.000 |

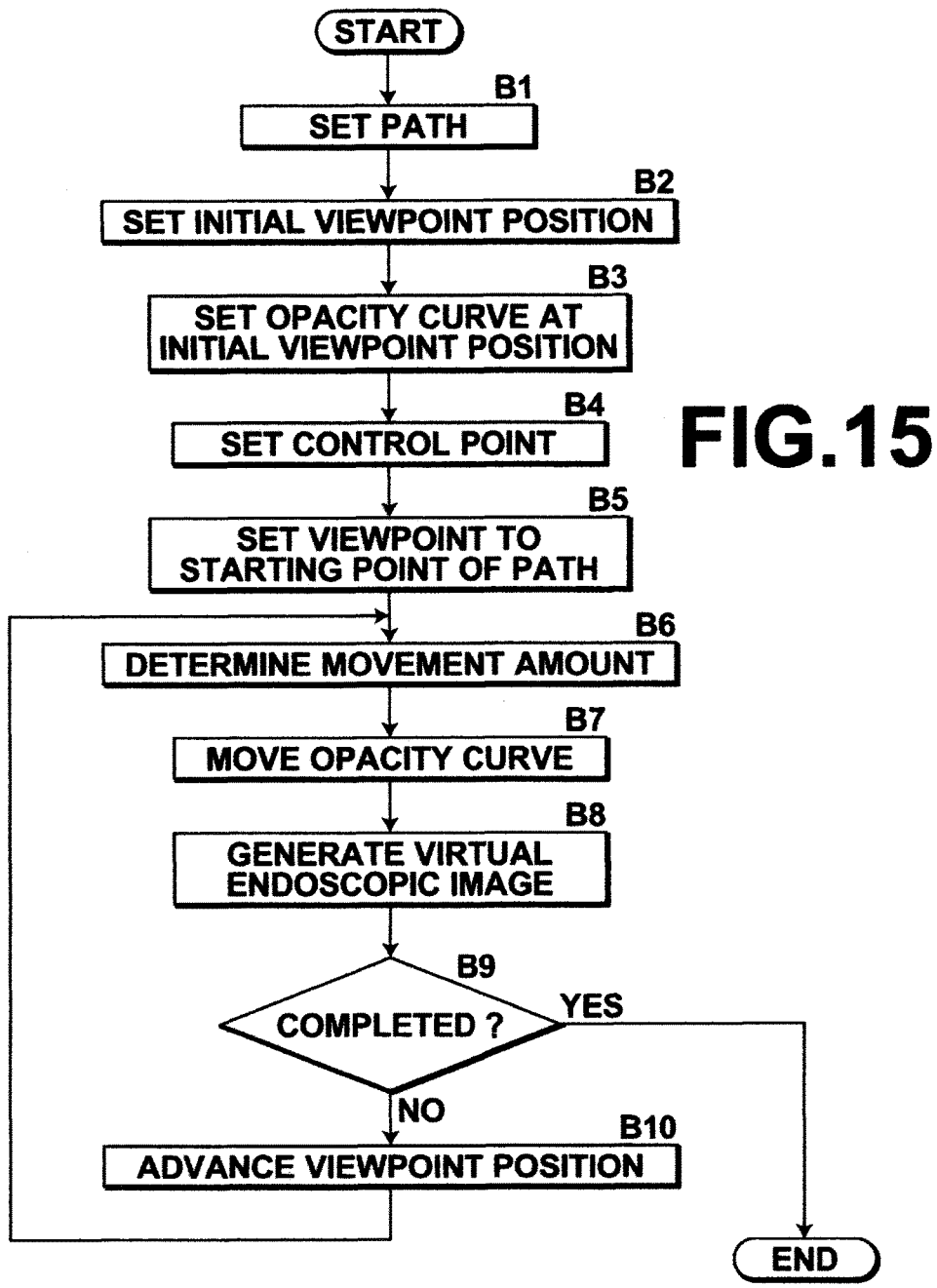

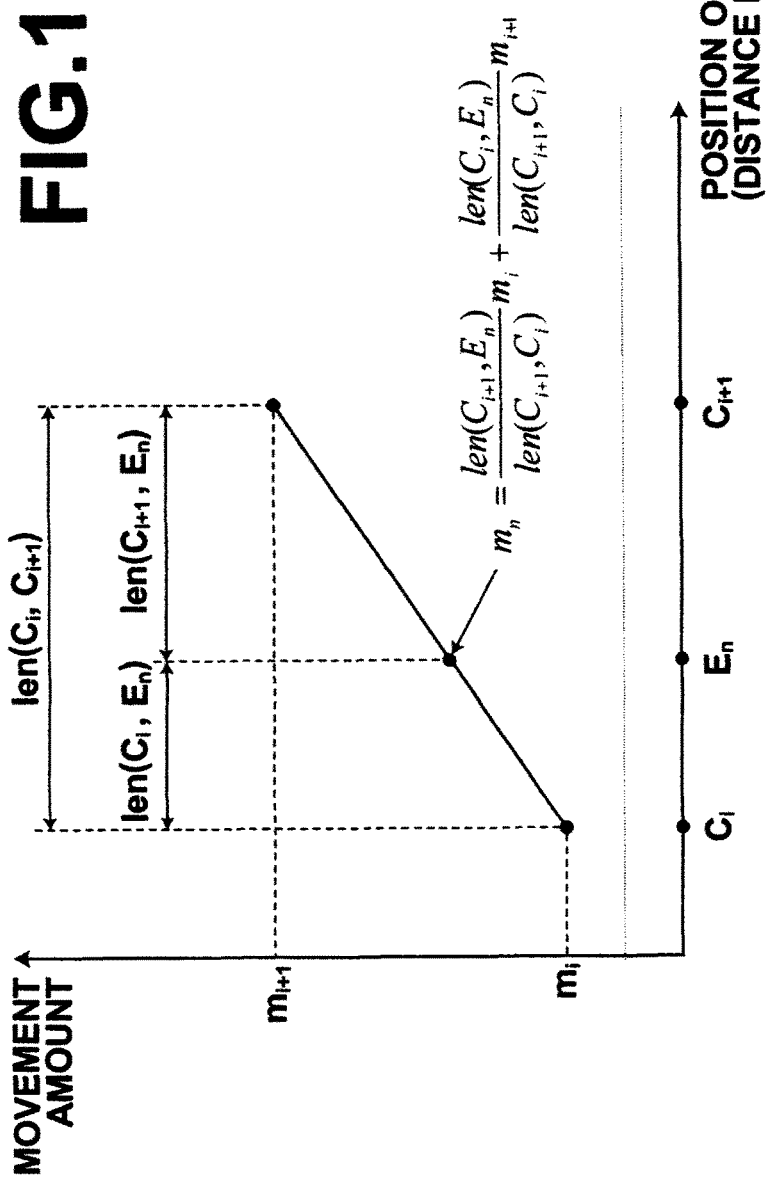

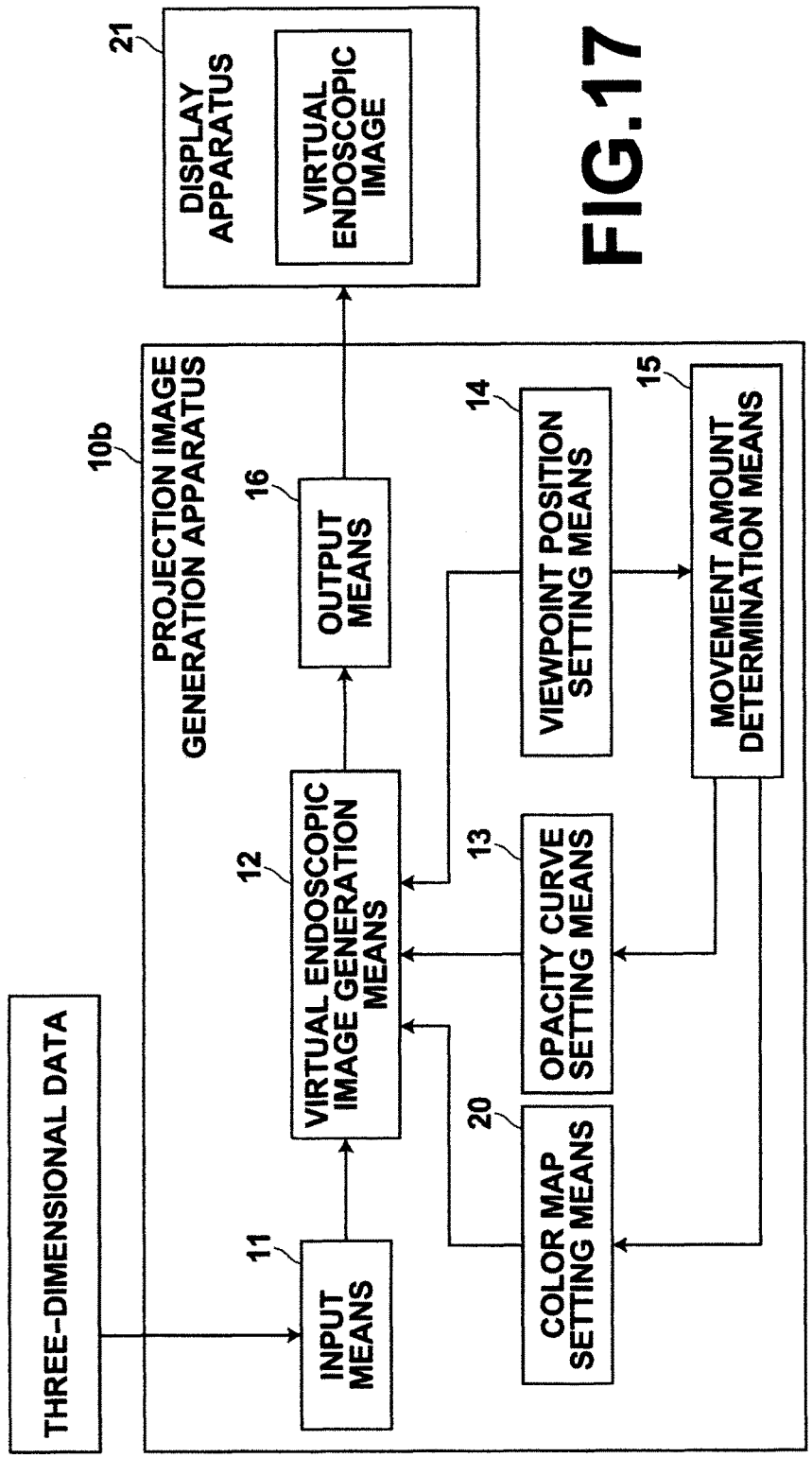

VIRTUAL ENDOSCOPIC IMAGE GENERATED USING AN OPACITY CURVE

BACKGROUND OF THE INVENTION

Field of the Invention

The present invention relates to a projection image generation apparatus, method, and program, and more specifically to a projection image generation apparatus, method, and program for generating, from three-dimensional image data representing an interior of a subject, a virtual endoscopic image, which is a pseudo three-dimensional image, for visualizing an interior of a lumen of the subject.

Description of the Related Art

Recently, with the advancement of imaging devices (modalities), resolution of image data obtained by imaging devices has been improved and detailed analysis of a subject based on image data has become possible. For example, multi detector-row computed tomography can capture a plurality of tomographic images at a time with a thin slice thickness. The reduced slice thickness may improve the resolution of three-dimensional image, formed of a plurality of tomographic images stacked on top of each other, in a body axis direction, whereby more detailed three-dimensional image can be obtained. By displaying and analyzing such three-dimensional data, it is possible to find a lesion or the like which, heretofore, has been difficult to find.

Three-dimensional data is not suitable for direct observation by the human eye. Therefore, three-dimensional data is generally displayed after being transformed into a pseudo three-dimensional image from an arbitrary viewpoint. With the improvement of three-dimensional data resolution, a high quality three-dimensional image can be generated and, as a consequence, a virtual endoscopic image display method has been proposed as an applied technology of three-dimensional image rendering. The virtual endoscopic display method is a method in which a viewpoint is set inside of a lumen and a perspective projection image is generated and displayed based on the viewpoint. The virtual endoscopic display may provide images which seem as if they were captured by the camera of an endoscope while being moved inside of a body by sequentially changing the viewpoint by the user.

In the virtual endoscopic display, inner walls of organs having a luminal structure, such as large intestines, bronchi, blood vessels, digestive organs, and the like are displayed (visualized). In the large intestine examination, in particular, the virtual endoscopic display is gaining popularity instead of actual endoscopic examination. In the examination of bronchial tubes, understanding of the branching structure of bronchial tube is often practiced using the virtual endoscopic display or cross-section display of an image as a preliminary simulation prior to a bronchoscopic examination or navigation during the examination.

For virtual endoscopic image generation methods, a surface rendering method and a volume rendering method are known. The surface rendering method realizes the visualization by extracting a lumen and building a surface model. The volume rendering method realizes the visualization by allocating opacity and chromaticity to three-dimensional data and performing ray casting. In either display method, a virtual endoscopic image can be obtained by setting a viewpoint inside of a lumen and performing visualization processing.

In the visualization by the volume rendering method, it is necessary to allocate appropriate opacity and chromaticity to three-dimensional data in order to determine a desired structure to be examined. In the virtual endoscopic display, a virtual endoscopic image is generated by allocating transparent opacity to a portion of the data corresponding to an inner cavity where a viewpoint is set and opaque opacity to a portion of the data corresponding to the inner wall. It is often the case that the opacity and chromaticity are allocated to pixel values (voxel values) constituting three-dimensional data, which are known as opacity curve setting and color mapping respectively. In most cases, these are parameters manually set by the user subjectively, but a method of automatically setting the opacity by combining a pixel value distribution, values of first and quadratic differential with the parameters is also proposed.

Japanese Unexamined Patent Publication No. 2004-283373 (paragraphs 0127 to 0131) is a document in which a method that selectively uses a plurality of opacity curves is described. In Japanese Unexamined Patent Publication No. 2004-283373, two opacity curves are selectively used. The first opacity curve is used to transparently display the inside of a blood vessel, while the second opacity curve is used to transparently display the outside of a blood vessel. The first opacity curve is applied when a viewpoint is outside of the blood vessel, while the second opacity curve is applied when a viewpoint is inside of the blood vessel. Japanese Unexamined Patent Publication No. 2004-283373 describes that a weighted average of pixel values adjacent to a viewpoint is taken, and one of the two opacity curves having lower opacity in terms of the average pixel value is used.

Here, if the luminal organ of the observation target is an organ of large structure, such as a large intestine, pixel values of an inner cavity portion as the air space are substantially constant and, therefore, an inner wall portion can be observed with the same opacity setting regardless of where in the lumen the viewpoint is located. But, for bronchial tubes and blood vessels, they gradually taper, as the luminal structure, toward the end, and greatly differ in the pixel value between proximal and distal end portions thereof. Consequently, if a virtual endoscopic image is generated using the same opacity setting between the proximal and distal end portions, the inner wall at the distal end portion can not be displayed although the inner wall at the proximal end portion can be displayed.

In Japanese Unexamined Patent Publication No. 2004-283373, two opacity curves are selectively used according to the situation. In Japanese Unexamined Patent Publication No. 2004-283373, however, two opacity curves are selectively used according only to whether or not the viewpoint is inside of a blood vessel. Japanese Unexamined Patent Publication No. 2004-283373 describes, in paragraph 0131, that it is necessary to finely adjust the opacity curves depending on the observation area of a blood vessel, but does not solve the aforementioned problem at all.

It is an object of the present invention to provide a projection image generation method and apparatus capable of solving the problem of the conventional technology described above and visualizing an interior of a lumen even when the position of the viewpoint is changed in virtual endoscopic image generation. It is a further object of the present invention to provide a computer readable recording medium on which is recorded a program for causing a computer to perform the projection image generation method.

SUMMARY OF THE INVENTION

In order to achieve the object of the present invention, a projection image generation apparatus is provided which includes:

a virtual endoscopic image generation means for generating, based on three-dimensional data representing an interior of a subject having a lumen captured by an imaging device, a virtual endoscopic image, which is a pseudo three-dimensional image, for visualizing an interior of the lumen by volume rendering;

an opacity curve setting means for setting, in the virtual endoscopic image generation means, an opacity curve which defines the relationship between pixel values of the three-dimensional data and opacity values and is used in the volume rendering;

a viewpoint position setting means for setting a viewpoint position of the virtual endoscopic image in the virtual endoscopic image generation means; and a movement amount determination means for determining a movement amount of the opacity curve for the viewpoint position set by the viewpoint position setting means with respect to the opacity curve at a reference viewpoint position, wherein, when a virtual endoscopic image with respect to the viewpoint position set by the viewpoint position setting means is generated by the virtual endoscopic image generation means, the opacity curve setting means sets, in the virtual endoscopic image generation means, an opacity curve obtained by moving the opacity curve at the reference viewpoint position by the movement amount determined by the movement amount determination means.

In the projection image generation apparatus of the present invention, the opacity curve setting means may be a means that translates the relationship between pixel values and opacity values defined by the opacity curve at the reference viewpoint position in a pixel value direction by the determined movement amount.

Further, when pixel values are represented by a variable "v", the opacity curve at the reference viewpoint position is represented by $O_D(V)$ and the movement amount determined by the movement amount determination means is represented by "m", the opacity curve setting means may be a means that sets an opacity curve represented by $O(v)=O_D(v-m)$ in the virtual endoscopic image generation means.

Still further, the reference viewpoint position may be a predetermined initial viewpoint position. Alternatively, when a viewpoint position change is made by the viewpoint position setting means, the reference viewpoint position may be the viewpoint position before the change.

Further, the movement amount determination means may be a means that determines the movement amount based on a data distribution of the three-dimensional data in an adjacent area of the reference viewpoint position and a data distribution of the three-dimensional data in an adjacent area of the viewpoint position set by the viewpoint position setting means.

Still further, the movement amount determination means may be a means that determines the movement amount by performing matching between a histogram representing a data distribution of the three-dimensional data in an adjacent area of the reference viewpoint position and a histogram representing a data distribution of the three-dimensional data in an adjacent area of the viewpoint position set by the viewpoint position setting means.

Further, when the histogram of pixel values of the three-dimensional data in an adjacent area of the reference viewpoint position is $H_D(v)$ with the pixel values being represented by a variable "v" and the histogram of pixel values of the three-dimensional data in an adjacent area of the viewpoint position set by the viewpoint position setting means is $H_n(v)$ with the pixel values being represented by the variable "v", the movement amount determination means may be a means that calculates a similarity degree between a histogram represented by $H_D(v-x)$ and the histogram $H_n(v)$ by changing the value of "x" and determines a value or "x" when the similarity degree becomes maximum as the movement amount.

Alternatively, when the histogram of pixel values of the three-dimensional data in an adjacent area of the reference viewpoint position is $H_D(v)$ with the pixel values being represented by a variable "v", the histogram of pixel values of the three-dimensional data in an adjacent area of the viewpoint position set by the viewpoint position setting means is $H_n(v)$ with the pixel values being represented by the variable "v", and $P(H(v))$ is a function for obtaining a peak position in histogram $H(v)$, the movement amount determination means may be a means that determines a value of "x" obtained by $x=P(H_D(v))-P(H_n(v))$ as the movement amount.

In the projection image generation apparatus of the present invention, the apparatus may further include a control point setting means for setting one or more control points in the lumen, setting an opacity curve for each control point by translating the opacity curve at the initial viewpoint position in a pixel value direction, and storing a location of each control point in the lumen and a movement amount from the opacity curve at the initial viewpoint position associated with each other as control point information, and the movement amount determination means may be a means that obtains an estimated value of movement amount at the viewpoint position set by the viewpoint position setting means from the opacity curve at the initial viewpoint position based on the location of the viewpoint position in the lumen set by the viewpoint position setting means, and the location of a control point in the lumen and the movement amount from the opacity curve at the initial viewpoint position included in the control point information.

In the projection image generation apparatus of the present invention, the apparatus may further include a path setting means for setting a path in the lumen, and the locations of the viewpoint position and each control point in the lumen may be represented by distances from a starting point of the path.

In the projection image generation apparatus of the present invention, the control point setting means may be a means that sets two or more control points, and the movement amount determination means may be a means that, when the viewpoint position set by the viewpoint position setting means is located between two control points in the lumen, obtains an estimated value of movement amount at the viewpoint position set by the viewpoint position setting means by interpolation based on the movement amount of each of at least the two control points.

Further, the movement amount determination means may be a means that obtains the estimated value of movement amount at the viewpoint position set by the viewpoint position setting means by spline interpolation based on the movement amount of each of four control points before and after the viewpoint position.

In the projection image generation apparatus of the present invention, the apparatus may further include a color map setting means for setting a color map which defines the relationship between pixel values of the three-dimensional data and display colors, and is used in the volume rendering, and the color map setting means may be a means that, when a virtual endoscopic image is generated with respect to the viewpoint position set by the viewpoint position setting means, sets, in the virtual endoscopic image generation means, a color map obtained by moving a color map at the reference viewpoint position by the movement amount determined by the movement amount determination means.

Further, the color map setting means may be a means that translates the relationship between pixel values and display colors defined by the color map at the reference viewpoint position in a pixel value direction by the determined movement amount.

Still further, when the pixel values are represented by a variable "v", the color map at the reference viewpoint position is represented by $ClrM_{apD}(v)$, and the movement amount determined by the movement amount determination means is represented by "m", the color map setting means may be a means that sets a color map represented by $ClrM_{ap}(v)=ClrM_{apD}(v-m)$ to virtual endoscopic image generation means.

A projection image generation method of the present invention is a method for generating, based on three-dimensional data representing an interior of a subject having a lumen captured by an imaging device, a virtual endoscopic image, which is a pseudo three-dimensional image, for visualizing an interior of the lumen by volume rendering, wherein an opacity curve which defines the relationship between pixel values of the three-dimensional data and opacity values, and is used in the volume rendering is moved from the opacity curve at a reference viewpoint position and the moved opacity curve is used to generate the virtual endoscopic image.

In the projection image generation method of the present invention, the movement of the opacity curve may be implemented by determining a movement amount for a viewpoint position at which a virtual endoscopic image is to be generated from the opacity curve at the reference viewpoint position, and moving the opacity curve by the determined movement amount.

Further, the movement of the opacity curve may be implemented by translating the relationship between pixel values and opacity values defined by the opacity curve at the reference viewpoint position in a pixel value direction by the determined movement amount.

Still further, the movement amount of the opacity curve may be determined based on a data distribution of the three-dimensional data in an adjacent area of the reference viewpoint position and a data distribution of the three-dimensional data in an adjacent area of the viewpoint position at which a virtual endoscopic image is to be generated.

In the projection image generation method of the present invention, before generating the virtual endoscopic image, one or more control points may be set in the lumen, a movement amount of the opacity curve for each control point may be set, and a location of each control point in the lumen and the movement amount of the opacity curve may be associated with each other and stored as control point information, and the movement amount of the opacity curve may be determined by obtaining an estimated value of movement amount for an opacity curve at the viewpoint position at which a virtual endoscopic image is to be generated based on the location of the viewpoint position in the lumen at which a virtual endoscopic image is to be generate, and the location of a control point and the movement amount of the opacity curve included in the control point information.

Further, the present invention provides a computer readable recording medium on which is recorded a program for causing a computer to perform the step of generating, based on three-dimensional data representing an interior of a subject having a lumen captured by an imaging device, a virtual endoscopic image, which is a pseudo three-dimensional image, for visualizing an interior of the lumen by volume rendering, wherein the program causes the computer to perform the step of moving an opacity curve which defines the relationship between pixel values of the three-dimensional data and opacity values, and is used in the volume rendering from an opacity curve at a reference viewpoint position and setting the moved opacity curve as the opacity curve used for generating the virtual endoscopic image.

In the present invention, an opacity curve at a reference viewpoint position is moved and a virtual endoscopic image is generated by volume rendering using the moved opacity curve. In the present invention, when a virtual endoscopic image is generated at a certain viewpoint position, the opacity curve used for generating a virtual endoscopic image at the reference viewpoint position is moved and the moved opacity curve is used. This allows the relationship between pixel values and opacity values defined by the opacity curve to be changed according to the viewpoint position, whereby an interior of a lumen is made viewable even when the viewpoint position is changed.

BRIEF DESCRIPTION OF THE DRAWINGS

FIG. 7 is a histogram illustrating a distribution of pixel values of adjacent area of viewpoint position B in FIG. 3.

FIG. 8 is a graph illustrating an opacity curve set at viewpoint position B.

FIG. 10B is a histogram illustrating a distribution of pixel values in an adjacent area of the viewpoint position in FIG. 10A.

FIG. 10C illustrates a virtual endoscopic image of an interior of the large intestine.

FIG. 15 is a flowchart illustrating a process of operation of the projection image generation apparatus shown in FIG. 14.

FIG. 16 illustrate linear interpolation of movement amount.

FIG. 17 is a block diagram of a projection image generation apparatus according to a third embodiment of the present invention.

DESCRIPTION OF THE PREFERRED EMBODIMENTS

Figure 1:
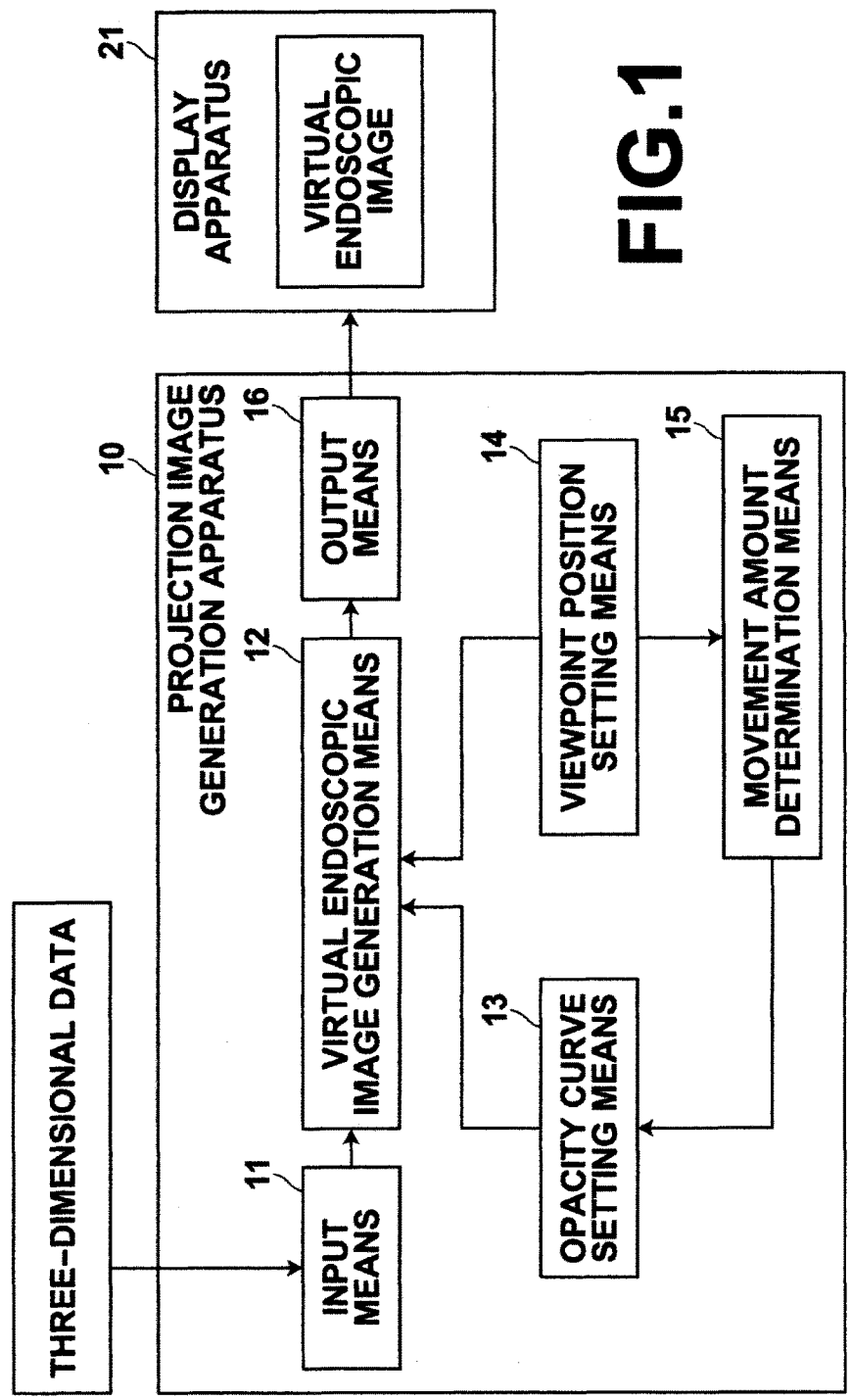
FIG. 1 is a block diagram of a projection image generation apparatus according to a first embodiment of the present invention.

Hereinafter, embodiments of the present invention will be described in detail with reference to the accompanying drawings. FIG. 1 is a block diagram of a projection image generation apparatus according to a first embodiment of the present invention. Projection image generation apparatus 10 includes input means 11, virtual endoscopic image generation means 12, opacity curve setting means 13, viewpoint position setting means 14, movement amount determination means 15, and output means 16. Projection image generation apparatus 10 is constructed by a computer system, such as a server or a workstation. Each function of projection image generation apparatus 10 can be realized by the computer system by performing processing according to a predetermined program.

Input means 11 receives a three-dimensional data. The three-dimensional data is a three-dimensional image data representing an interior of a subject imaged by a medical image diagnostic (imaging) apparatus. The imaging apparatus used for imaging a three-dimensional data is typically X-ray CT, and the three-dimensional data is typically a three-dimensional image data formed of a plurality of stacked tomographic images of a subject sliced at a predetermined thickness. The subject has a lumen inside thereof. Input means 11 stores the three-dimensional image data in a storage device (not shown), such as a hard disk, built into or coupled to projection image generation apparatus 10.

Virtual endoscopic image generation means 12 generates a virtual endoscopic image based on the three-dimensional data. The virtual endoscopic image is a pseudo three-dimensional image for visualizing an interior of the lumen of the subject. Virtual endoscopic image generation means 12 generates a virtual endoscopic image for visualizing, for example, an interior of a bronchial tube, a blood vessel, or a digestive organ. Virtual endoscopic image generation means 12 generates a virtual endoscopic image using a volume rendering method.

Output means 16 outputs the virtual endoscopic image to display apparatus 21. For example, display apparatus 21 is a liquid crystal display. Display apparatus 21 displays the virtual endoscopic image and other various types of information. The user diagnoses a luminal organ, such as a bronchial tube, a blood vessel, or a digestive organ, by examining the virtual endoscopic image displayed on the display apparatus 21.

Opacity curve setting means 13 determines opacity setting (opacity curve) used for generating a virtual endoscopic image by volume rendering. The opacity curve defines the relationship between pixel values of three-dimensional data and opacity values. The opacity curve can be represented by a function with the pixel value of three-dimensional data as the variable. Viewpoint position setting means 14 sets a viewpoint position of a virtual endoscopic image in virtual endoscopic image generation means 12. Virtual endoscopic image generation means 12 generates a virtual endoscopic image viewed from the viewpoint position set by viewpoint position setting means 14 using the opacity curve set by opacity curve setting means 13.

When a virtual endoscopic image is generated by virtual endoscopic image generation means 12 with an initial viewpoint position, opacity curve setting means 13 sets an opacity curve by an arbitrary method. For example, opacity curve setting means 13 sets an opacity curve by referring to the three-dimensional data to check the distribution of the data (pixel values) adjacent to the initial viewpoint position and obtaining a pixel value serving as the boundary between the inner cavity and inner wall based on the distribution. Otherwise, opacity curve setting means 13 may set opacity setting manually set by the operator as the opacity curve with respect to the initial viewpoint position. For example, when a virtual endoscopic image is generated by setting a path along with a lumen and moving the position of viewpoint on the path, the initial viewpoint position may be the starting point of the path.

Here, a point where the opacity value changes from "0" to a value other than "0" or from "1" to a value other than "1" according to a change in pixel value is defined as a change point of an opacity curve. The opacity curve includes one or more change points. The opacity curve may change in a stepwise manner from opacity value "0" to opacity value "1" across a change point. Alternatively, the opacity curve may change with a predetermined gradient from a change point according to an increase or decrease in pixel value.

Movement amount determination means 15 determines a movement amount of an opacity curve at a reference viewpoint position for a viewpoint position set by viewpoint position setting means 14. For example, when a reference position change is made by viewpoint position setting means 14, the reference viewpoint position may be the viewpoint position before the change. For example, movement amount determination means 15 determines, every time the viewpoint position is changed by viewpoint position setting means 14, a movement amount of a change point of an opacity curve at a viewpoint position after the change with respect to the change point of the opacity curve at a viewpoint before the change. Movement amount determination means 15 determines a movement amount based, for example, on a data distribution of an adjacent area of a viewpoint before the change and a data distribution of an adjacent area of a viewpoint after the change in three dimensional data.

When a virtual endoscopic image is generated by virtual endoscopic image generation means 12 with respect to a viewpoint set by viewpoint position setting means 14, opacity curve setting means 13 sets an opacity curve, which is the opacity curve at the reference viewpoint position moved by an amount determined by movement amount determination means 15, to virtual endoscopic image generation means 12. For example, opacity curve setting means 13 receives a movement amount from movement amount determination means 15 every time the viewpoint position is changed by viewpoint position setting means 14. When a movement amount is received, opacity curve setting means 13 moves the opacity curve used for generating the virtual endoscopic image at the viewpoint position before the change by the movement amount to generate and set a new opacity curve to virtual endoscopic image generation means 12.

Opacity curve setting means 13 translates the relationship between pixel values and opacity values defined by the opacity curve at the reference viewpoint position in a pixel value direction by the movement amount determined by movement amount determination means 15. That is, when the pixel value is represented by a variable "v", the opacity curve at the reference viewpoint position is represented by $O_D(v)$ and the movement amount determined by movement amount determination means 15 is represented by "m", opacity curve setting means 13 sets an opacity curve represented by $O(v)=O_D(v-m)$ to virtual endoscopic image generation means 12 as the opacity curve after movement.

Where the reference viewpoint is a viewpoint position before the viewpoint position is changed, if the viewpoint position after the change is an $n^{th}$ (n is an integer not less than 1) viewpoint, the reference viewpoint position is a $(n-1)^{th}$ viewpoint position. When n=1, the initial viewpoint position can be regarded as the viewpoint position before the change ($0^{th}$ viewpoint position). In this case, the opacity curve after the viewpoint change, i.e., the opacity curve at $n^{th}$ viewpoint position, $O_n(v)$ can be represented using the opacity curve $O_{n-1}(v)$ at $(n-1)^{th}$ viewpoint position as $O_n(v)=O_{n-1}(v-m)$.

Figure 2:
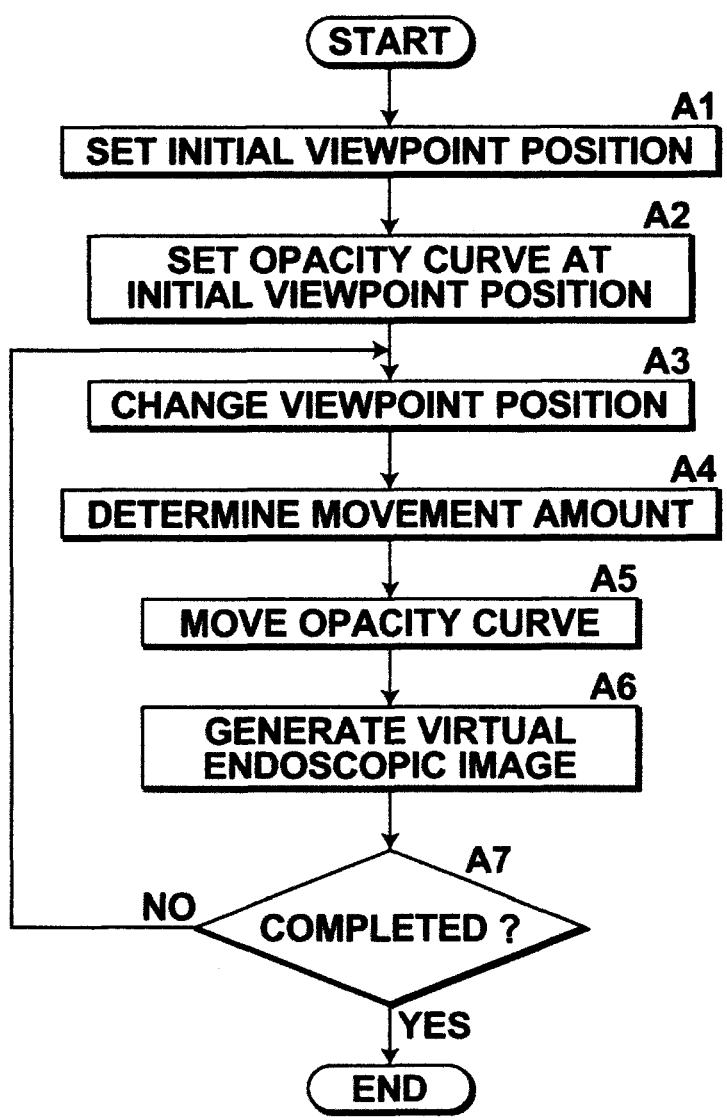
FIG. 2 is a flowchart illustrating a process of operation of the projection image generation apparatus shown in FIG. 1.

FIG. 2 illustrates a process of operation of the projection image generation apparatus shown in FIG. 1. Viewpoint position setting means 14 sets the initial viewpoint position as the viewpoint position of a virtual endoscopic image (Step A1). Opacity curve setting means 13 sets an opacity curve with respect to the initial viewpoint position (Step A2). For example, opacity curve setting means 13 examines the distribution of pixel values adjacent to the coordinate position set as the initial viewpoint position with reference to three-dimensional data and automatically sets the opacity curve. Alternatively, an arrangement may be adopted in which a virtual endoscopic image at the initial viewpoint position may be generated by virtual endoscopic image generation means 12, then an opacity curve is manually set by the user such that the inner wall becomes viewable by observing the virtual endoscopic image, and the manually set opacity curve is used as the opacity curve at the initial viewpoint.

Viewpoint position setting means 14 changes the viewpoint position (Step A3). Viewpoint position setting means 14 sets the viewpoint position after the viewpoint position change to virtual endoscopic image generation means 12. Also, viewpoint position setting means 14 notifies the viewpoint position after the change to movement amount determination means 15. Movement amount determination means 15 determines a movement amount of the opacity curve associated with the viewpoint position change (Step A4). If the viewpoint position change is the first change, movement amount determination means 15 assumes that the viewpoint position before the change is at the initial viewpoint position and determines a movement amount from the opacity curve set with respect to the initial viewpoint position. If the viewpoint position change is the second or further time, movement amount determination means 15 determines a movement amount from the opacity curve used for generating a virtual endoscopic image at the previous viewpoint position.

Movement amount determination means 15 may determine the movement amount using a histogram representing data distributions of adjacent areas of before and after a viewpoint position change. For example, movement amount determination means 15 obtains, with pixel values being represented by a variable "v", a histogram $H_{n-1}(v)$ of an adjacent area of the viewpoint position before the change and a histogram $H_n(v)$ of an adjacent area of the viewpoint position after the change. Movement amount determination means 15 may determine the movement amount by performing matching between histograms at viewpoint position before and after the viewpoint position change. For example, movement amount determination means 15 may calculate a similarity between $H_{n-1}(v-x)$ which is the histogram of viewpoint position before the change moved by "x" in a pixel value direction and $H_n(v)$ which is the histogram of the viewpoint position after the change while changing the value of "x". Preferably, the similarity is calculated after normalizing the histograms. Movement amount determination means 15 obtains the value of "x" which provides a highest similarity between the histograms. Movement amount determination means 15 may determine the value of "x" obtained in the manner as described above as the movement amount "m" of the opacity curve.

Alternatively, movement amount determination means 15 may obtain how much the peak of pixel value histogram is moved before and after a viewpoint change and use the value as the movement amount of the opacity curve. For example, a function for obtaining a peak position of a histogram is assumed to be $P(H(v))$. Assuming $P(v))$ as a peak value of the histogram of an adjacent area of the viewpoint position before the change and $P(H_n(v))$ as a peak value of the histogram of an adjacent area of the viewpoint position after the change, movement amount determination means 15 may determine the value of "x" obtained as in $x=P(H_n(v))-(H_{n-1}(v))$ as the movement amount "m" of the opacity curve.

Opacity curve setting means 13 receives a notice of the movement amount from movement amount determination means 15. Opacity curve setting means 13 moves the opacity curve by the notified movement amount (Step A5). More specifically, opacity curve setting means 13 moves the relationship between pixel values and opacity values defined by the opacity curve at the viewpoint position before the change by the notified movement amount in a pixel value direction and determines the moved opacity curve as the opacity curve (opacity setting) at the viewpoint position after the change. Opacity curve setting means 13 sets the opacity curve moved by the movement amount to virtual endoscopic image generation means 12.

If the viewpoint position change is the first change (n=1), opacity curve setting means 13 sets, with the opacity curve set with respect to the initial viewpoint position as $O_0(v)$, the opacity curve represented by $O_1(v)=O_0(v-m)$ to virtual endoscopic image generation means 12. If the viewpoint position change is the second or further time (n>2), opacity curve setting means 13, with respect to $n^{th}$ viewpoint position, translates the opacity curve ($O_{n-1}(v)$) used for generating a virtual endoscopic image at the $(n-1)^{th}$ viewpoint position in a pixel value direction by the movement amount "m" and sets the opacity curve represented by $O_n(v)=O_{n-1}(v-m)$ to virtual endoscopic image generation means 12.

Virtual endoscopic image generation means 12 generates a virtual endoscopic image at the viewpoint position after the viewpoint position change by a volume rendering method using the opacity curve set by opacity curve setting means 13 (Step A6). Projection image generation apparatus 10 determines whether or not to complete the virtual endoscopic image generation (Step A7). When an instruction to complete the generation is given by the user, the process is completed, while if a virtual endoscopic image is to be generated at the next viewpoint position, the process returns to Step A3. Projection image generation apparatus 10 repeats Steps A3 to A7 any number of times in which the viewpoint position is changed and the opacity curve is moved according to the viewpoint position, whereby a virtual endoscopic image is generated.

Figure 3:
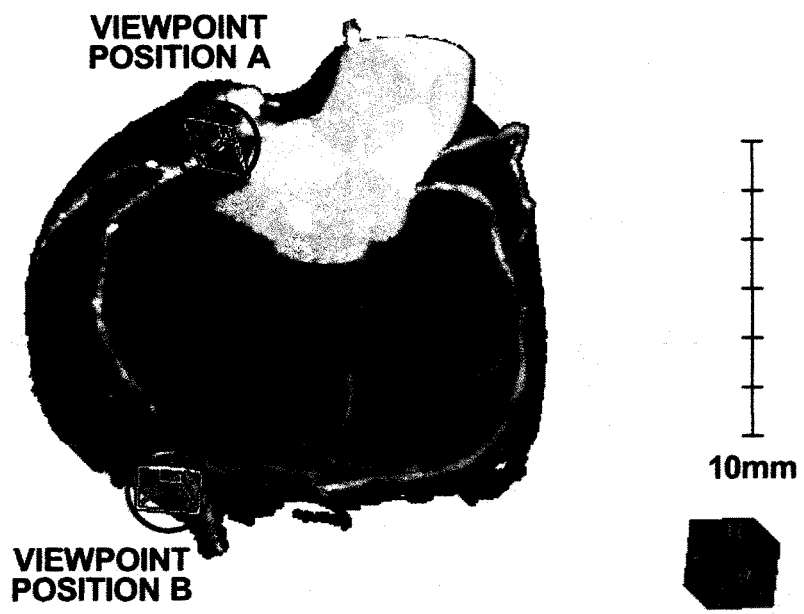
FIG. 3 illustrates an organ visualized by a pseudo three-dimensional image.

Hereinafter, description will be made using a specific example. FIG. 3 illustrates an organ included in a three-dimensional data visualized by a pseudo three-dimensional image. The three-dimensional data is a three-dimensional image data captured using, for example, a multi-detector-row X-ray CT, and each pixel (voxel) of the three-dimensional data includes a CT value as the pixel value. Now, it is assumed that a virtual endoscopic image of a blood vessel interior is generated with viewpoint A and viewpoint B shown in FIG. 3 as the viewpoints. Here, viewpoint A is assumed to be the initial viewpoint position.

Figure 4:
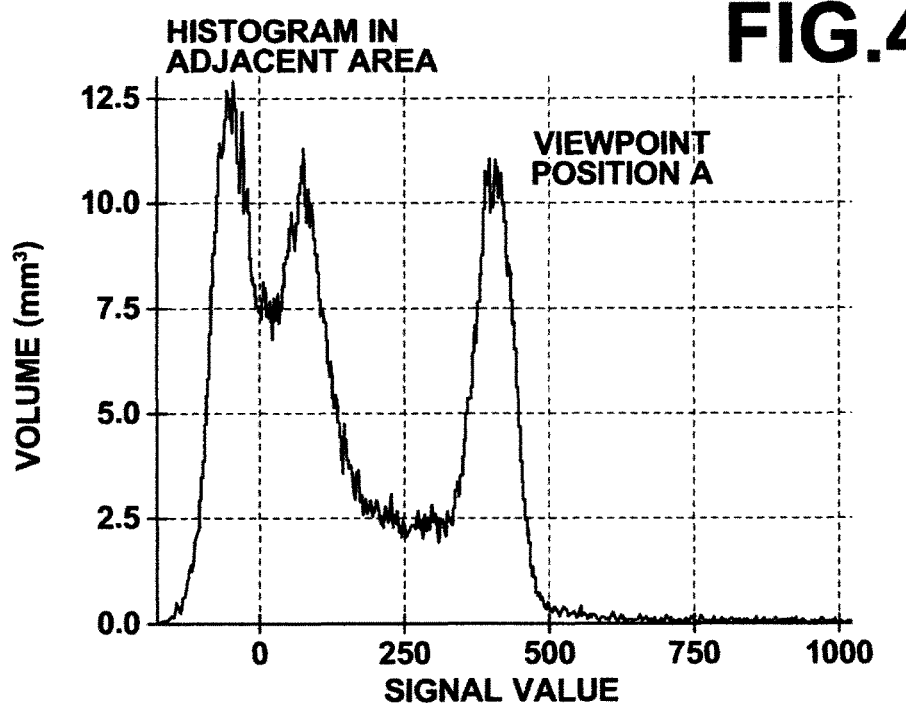
FIG. 4 is a histogram illustrating a distribution of pixel values in an adjacent area of viewpoint position A in FIG. 3.
Figure 5:
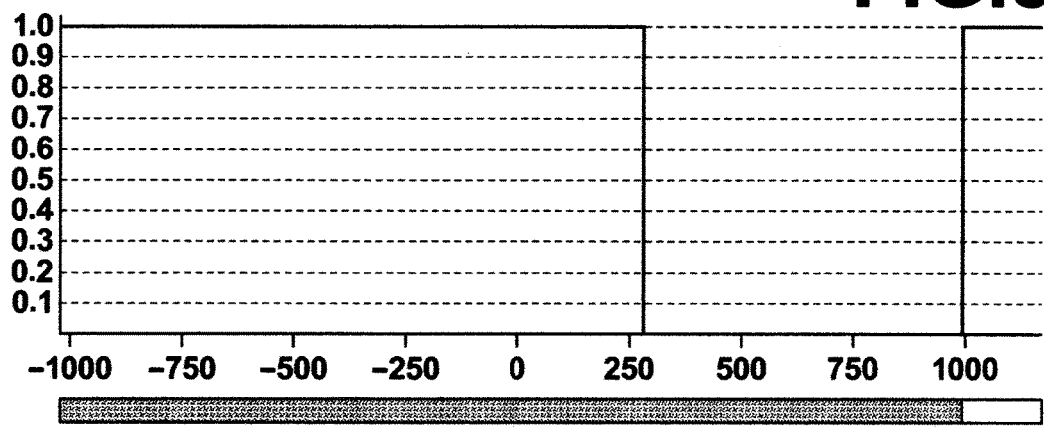
FIG. 5 is a graph illustrating an opacity curve set at viewpoint position A.

FIG. 4 illustrates a histogram of pixel values in an adjacent area of viewpoint position A. FIG. 4 shows that pixel values (CT values) of a portion forming the inner wall of the blood vessel and CT values of the other portion can be separated at around a CT value of 280. FIG. 5 shows an opacity curve set at viewpoint position A. The change position of the opacity curve lies near a CT value of 280. That is, the opacity curve at viewpoint position A changes in opacity value from "1" to "0" at around a CT value of 280. Any method may be used to set the opacity curve at viewpoint position A, and the opacity curve may be automatically set by opacity curve setting means 13 based on the histogram of pixel values. Alternatively, the user may change an opacity curve while observing a virtual endoscopic image and manually sets an opacity curve that allows an inner wall portion of the blood vessel to be observed most clearly, and sets the opacity curve as the opacity curve at viewpoint position A.

Figure 6:
FIG. 6 illustrates a virtual endoscopic image generated at viewpoint position A.

FIG. 6 illustrates a virtual endoscopic image generated by performing volume rendering using the opacity curve in FIG. 5. The use of the opacity curve in FIG. 5 allows an inner wall portion to be visualized by a pseudo three-dimensional image, as illustrated in FIG. 6.

Now, it is assumed that the viewpoint position of the virtual endoscopic image is changed by viewpoint position setting means 14 from viewpoint position A to viewpoint position B shown in FIG. 3. FIG. 7 is a histogram of pixel values of adjacent area of viewpoint position B. Comparison between the histogram shown in FIG. 3 and the histogram shown in FIG. 7 shows that CT values, in general, are shifted to lower side in the histogram shown in FIG. 7. Movement amount determination means 15 matches between histograms at viewpoint positions before and after the viewpoint position change and determines the movement amount of the opacity curve. It is assumed, here, that the determined movement amount is −180.

Figure 9:
FIG. 9 illustrates a virtual endoscopic image generated at viewpoint position B.

FIG. 8 illustrates the opacity curve at viewpoint position B. Opacity curve setting means 13 set an opacity curve obtained by translating the opacity curve shown in FIG. 5 to the lower pixel value side (to the left side in FIG. 8) by the movement amount of 180 as the opacity curve at viewpoint position B. Movement of the opacity curve to the left side in FIG. 8 causes the change position which is about 280 in FIG. 5 to be changed to about 100 in FIG. 8. FIG. 9 illustrates a virtual endoscopic image generated by performing volume rendering using the opacity curve in FIG. 8. The use of the opacity curve in FIG. 8 allows an inner wall portion to be visualized by a pseudo three-dimensional image, as illustrated in FIG. 9.

Figure 10A:
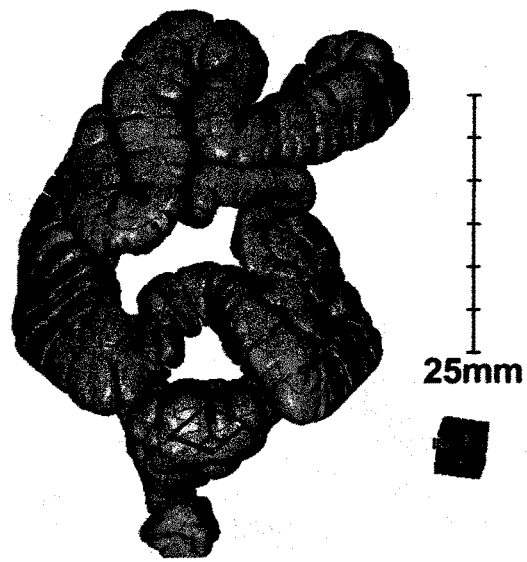
FIG. 10A illustrates a viewpoint position in a large intestine.
Figure 11A:
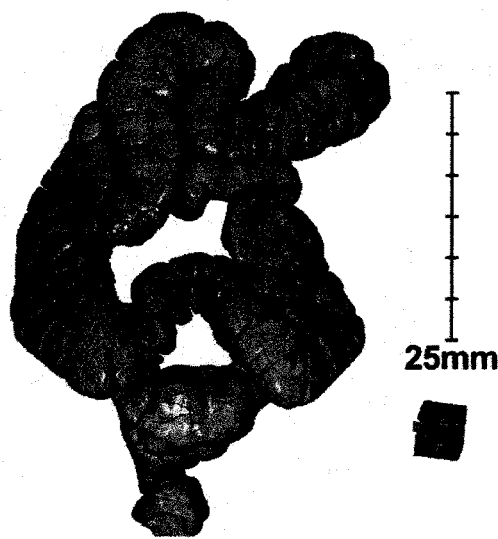
FIG. 11A illustrates another viewpoint position in the large intestine.
Figure 11B:
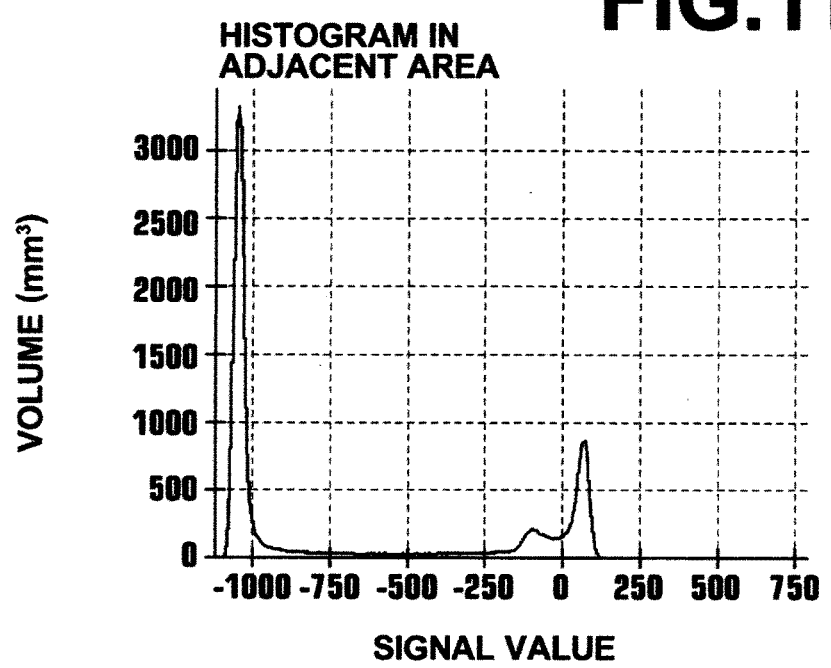
FIG. 11B is a histogram illustrating a distribution of pixel values in an adjacent area of the viewpoint position in FIG. 11A.
Figure 11C:
FIG. 11C illustrates a virtual endoscopic image of an interior of the large intestine.
Figure 12:
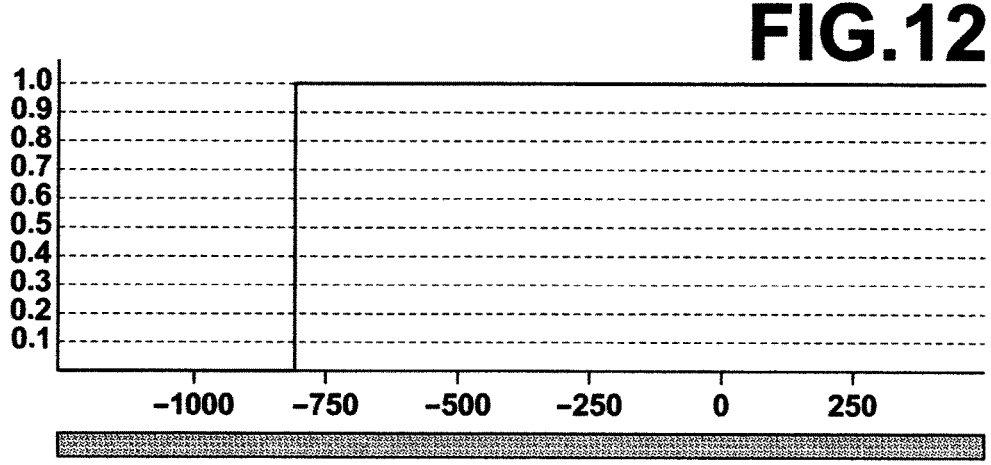
FIG. 12 is a graph illustrating the opacity curve used for generating the virtual endoscopic image.

Now, as a comparative example, a case is considered in which the opacity curve is not translated even when the viewpoint position is changed. First, a virtual endoscopic image of a large intestine is considered. FIG. 10A illustrates a viewpoint position in the large intestine, FIG. 10B illustrates a histogram of pixel values of adjacent area of the viewpoint position shown in FIG. 10A, and FIG. 10C illustrates a virtual endoscopic image of the large intestine. FIG. 11A illustrates another viewpoint position in the large intestine, FIG. 11B illustrates a histogram of pixel values of adjacent area of the viewpoint position shown in FIG. 11A, and FIG. 11C illustrates a virtual endoscopic image of the large intestine. FIG. 12 illustrates an opacity curve used for generating the virtual endoscopic image.

As shown in FIGS. 10B and 11B, pixel values (CT values) of an inner cavity portion, as the air space, are substantially constant for a large luminal structure, such as a large intestine. Further, CT values of an inner wall portion of the large intestine do not change largely even when the viewpoint position is changed and CT values of the inner cavity portion can be easily separated from CT values of the inner wall portion. Therefore, even when virtual endoscopic images are generated at the viewpoint position shown in FIG. 10A and the viewpoint position shown in FIG. 11A using the opacity curve shown in FIG. 12, the inner wall can be visualized at the both viewpoint positions, as shown in FIGS. 10C and 11C. That is, if a lumen to be displayed is an organ like a large intestine, it is not necessary to move the opacity curve even when the viewpoint position is changed.

Figure 13:
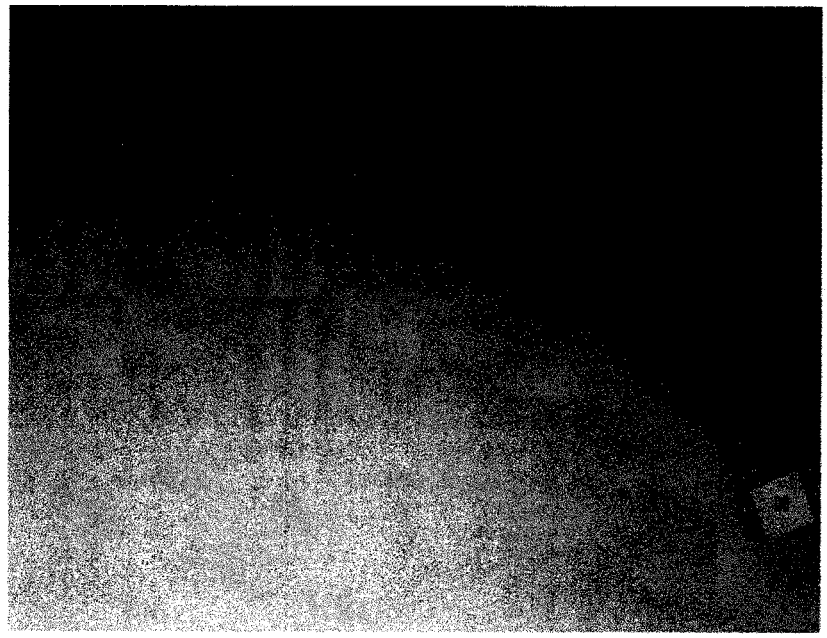
FIG. 13 shows another example of virtual endoscopic image generated at viewpoint position B.

Next, a case is considered in which the opacity curve is not moved in the generation of the virtual endoscopic image of the blood vessel portion shown in FIG. 3. FIG. 13 shows a virtual endoscopic image generated at view point position B using the opacity curve for viewpoint position A (FIG. 5). A case is considered in which a virtual endoscopic image is generated at viewpoint position B located at an end portion of the blood vessel by volume rendering through the direct use of the opacity curve at viewpoint position A shown in FIG. 5. Comparison between the opacity curve in FIG. 5 and the histogram of pixel values in an adjacent area of viewpoint position B in FIG. 7 shows that all pixels of the adjacent area of viewpoint position B are pixels with an opacity value of "1". Consequently, if a virtual endoscopic image is generated at viewpoint position B using an opacity curve that may provide a favorable virtual endoscopic image at viewpoint position A, the viewpoint position becomes transparent and nothing can be observed, as shown in FIG. 13.

In the present embodiment, movement amount determination means 15 determines a movement amount from an opacity curve at a reference viewpoint position for a newly set viewpoint position, opacity curve setting means 13 sets an opacity curve obtained by moving the opacity curve at the reference viewpoint position by the movement amount to virtual endoscopic image generation means 12. When the viewpoint position set by viewpoint position setting means 14 is changed, opacity curve setting means 13 moves the opacity curve in association with the viewpoint position change. This allows the opacity curve to be changed appropriately according to the viewpoint position change and, in virtual endoscopic image generation, even when the viewpoint position is changed, the interior of the lumen can be visualized.

In the present embodiment, movement amount determination means 15 determines a movement amount based on a data distribution of an adjacent area of the reference viewpoint position and a data distribution of an adjacent area of a viewpoint position set by viewpoint position setting means 14. If such configuration is adopted, the movement amount is automatically determined according to data around the viewpoint position to be displayed in the virtual endoscopic image and the opacity curve at the viewpoint after a viewpoint position change can be automatically set. Consequently, in the present embodiment, the opacity value, which is the display parameter, can be automatically and appropriately set for the observation of the image.

For a luminal organ, such as a blood vessel, in which pixel values of three-dimensional data changes largely according to the position in the lumen, it is not possible to observe the interior of all portions of the lumen by the use of the same opacity curve. In the present embodiment, the opacity curve is set according to the viewpoint position, so that the inner wall of a lumen can be visualized and displayed at each viewpoint position. Further, for example, when a contrast agent is used, there may be a case in which CT values differ greatly depending on the position of a blood vessel due to the effect of the contrast agent although the size of the vessel itself is similar. In such a case, the opacity curve is moved by opacity curve setting means 13 according to the viewpoint position change, thereby allowing and an inner wall portion to be observed in the virtual endoscopic image.

Figure 14:
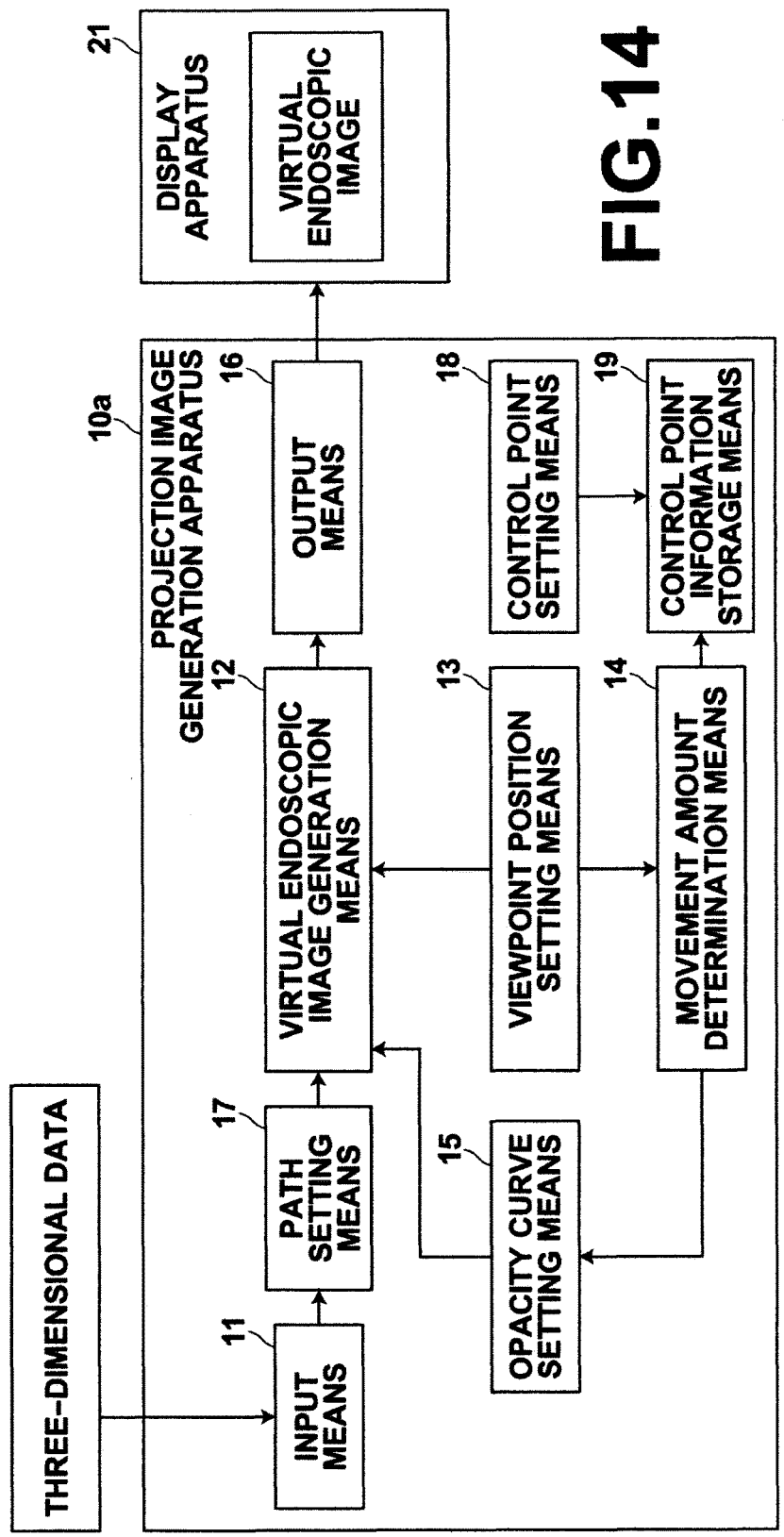
FIG. 14 is a block diagram of a projection image generation apparatus according to a second embodiment of the present invention.

Next, a second embodiment of the present invention will be described. FIG. 14 illustrates a projection image generation apparatus according to the second embodiment of the present invention. Projection image generation apparatus 10a of the present embodiment includes, in addition to the configuration shown in FIG. 1, path setting means 17, control point setting means 18, and control point information storage means 19. Path setting means 17 obtains a pathway of a lumen and sets a path in the lumen. For example, path setting means 17 obtains a center line of a lumen and sets the center line as the path. Viewpoint position setting means 14 sets a viewpoint position on the path set by path setting means 17. The location of a viewpoint position in a lumen can be represented by the distance from the starting point of the path.

Control point setting means 18 sets at least one control point in a lumen. The term "control point" as used herein refers to a point at which an opacity curve is set other than the initial viewpoint position. But, the initial viewpoint position may also be regarded as one of control points. Control point setting means 18 performs, with respect to each control point, opacity setting used for generating a virtual endoscopic image using the control point as the viewpoint position. This setting can be made by translating the opacity curve set for the initial viewpoint position in a pixel value direction. In this case, opacity setting at an $i^{th}$ control point is equivalent to determining, when the opacity curve at the initial viewpoint position is assumed to be $O_0(v)$, movement amount $m_i$ in $O_i(v)=O_0(v-m_i)$. Control point setting means 18 stores the position of a control point in a lumen and a movement amount from the opacity curve at the initial viewpoint position in control point information storage means 19 as control point information. The location of control point in a lumen can be represented by the distance from the starting point of the path as in the viewpoint position.

In the present embodiment, movement amount determination means 15 determines a movement amount for an opacity curve at the viewpoint position set by viewpoint position setting means 14 using opacity setting at the control point. More specifically, based on the position of the opacity curve at the viewpoint position set by viewpoint position setting means 14 in the lumen and movement amount of the opacity curve, an estimated value of the movement amount for the opacity curve at the viewpoint position set by viewpoint position setting means 14 is obtained and the estimated value is determined as the movement amount. For example, movement amount determination means 15 obtains an estimated value of movement amount by interpolating the movement amount at a control point.

For example, control point setting means 18 serially sets control points C1, C2, C3, - - - from the starting point of a path. It is assumed here that the initial viewpoint position corresponds to the starting point of the path and is regarded as control point $C_0$. For example, a control point may be set in the following manner. First, an opacity curve is set at the initial viewpoint position in advance. The method of adjusting the opacity curve at the initial viewpoint position is identical to that of the first embodiment. Then, viewpoint position setting means 14 advances the viewpoint position along the path and virtual endoscopic image generation means 12 generates virtual endoscopic images at viewpoint positions along the path. Here, opacity curve setting means 13 sets the opacity curve at the initial viewpoint position to virtual endoscopic image generation means 12.

When an inner wall of a lumen becomes no longer observable in a virtual endoscopic image generated using the opacity curve at the initial viewpoint position, the user issues an instruction to reset the opacity curve to the projection image generation apparatus. Control point setting means 18 stores a point at which the opacity curve resetting instruction is received to control point information storage means as a control point. Further, control point setting means 18 translates the opacity curve at the initial viewpoint position in a pixel value direction so that the inner wall of the lumen becomes observable at the point where the opacity curve resetting instruction is received. The movement amount in the translation may be determined by movement amount determination means 15 in a manner identical to that of the first embodiment or manually by the user. Control point setting means 18 stores the movement amount in the translation in control point information storage means 19 associated with the position of the control point in the lumen.

Instead of the description above, control point setting means 18 may internally divide the path from the starting point to end point at equal intervals and each internal division point may be set as a control point. In this case also, control point setting means 18 translates the opacity curve at the initial viewpoint position in a pixel value direction so that the inner wall of the lumen becomes observable at each control point and stores the movement amount and the position of the control point in the lumen are stored in control point storage means 19. Further to the internal division points, control point setting means 18 may add any point as a control point. For example, when an instruction to reset the opacity curve is issued by the user at a point other than the internal division points, control point setting means 18 may add the point as a control point.

After control positions are set, viewpoint position setting means 14 sequentially changes the viewpoint position along the path. Movement amount determination means 15 searches for control points that sandwiches a viewpoint position set by viewpoint position setting means 14. When a viewpoint position lies between two control points on the path, movement amount determination means 15 obtains an estimated value of movement amount by interpolation based on a movement amount at each of the two control points sandwiching the viewpoint position. If the interpolation is a linear interpolation, movement amount determination means 15 may estimate the movement amount of the viewpoint position from the movement amounts of the two control points sandwiching the viewpoint position. Where a higher order interpolation, such as spline interpolation, is used, the estimated value of movement amount of the viewpoint position may be obtained from movement amounts of four control points before and after the viewpoint position.

FIG. 15 illustrates a process of operation of the projection image generation apparatus of the present embodiment when generating virtual endoscopic images while moving the viewpoint along the path. Path setting means 17 sets a path inside of a lumen to be displayed by a virtual endoscopic image (Step B1). Viewpoint position setting means 14 sets an initial viewpoint position (Step B2). The initial viewpoint position is, for example, the starting point of the path set in Step B1. Opacity curve setting means 13 sets an opacity curve for the initial viewpoint position (Step B3). The method of setting the opacity curve at the initial position is identical to that of the first embodiment.

Control point setting means 18 sets an arbitrary number of control points on the path set in Step B1 (Step B4). Control point setting means 18 obtains a movement amount from the opacity curve at the initial viewpoint position with respect to each control point and stores the positions of control points on the path and movement amounts for the opacity curves in control point information storage means 19. Note that the initial viewpoint position is regarded as one of the control points. The movement amount of the opacity curve at the initial viewpoint position regarded as a control point is zero (0). Further, for the sake of simplicity of the description, the control points are arranged in the order of $C_0$, $C_1$, $C_2$, - - - from the starting point side of the path. When the initial viewpoint position is the starting point of the path, the initial viewpoint position is regarded as the control point $C_0$.

Viewpoint setting means 14 sets the viewpoint position at the starting point of the path (Step B5). Movement amount determination means 15 determines a movement amount for the opacity curve at the viewpoint set by viewpoint setting means 14 (Step B6). Opacity curve setting means 13 sets an opacity curve obtained by moving the opacity curve at the initial viewpoint position by the movement amount determined in Step B6 to virtual endoscopic image generation means 12 (Step B7). Virtual endoscopic image generation means 12 generates a virtual endoscopic image by a volume rendering method using the opacity curve set in Step B7 (Step B8).

Viewpoint position setting means 14 determines whether or not the viewpoint position is the end point of the path (Step B9). When virtual endoscopic images are generated to the end point of the path, the process is completed. If determined that the viewpoint position does not reach the end point of the path, viewpoint position setting means 14 advances the viewpoint position from the current viewpoint position toward the end point side of the path (Step B10). Thereafter, the process returns to Step B6. Projection image generation apparatus 10a repeats Step B6 to Step B10, thereby generating virtual endoscopic images while advancing the viewpoint position along the path.

FIG. 16 illustrates movement amounts of control points and a movement amount of a current viewpoint position to be determined by movement amount determination means 15. When the current viewpoint position coincides with a control point, movement amount determination means 15 may directly determines the movement amount stored in control point information storage means 19 associated with the control point as the movement amount of the current viewpoint position. If the current viewpoint position is sandwiched between two control points, the movement amount at the position is not stored in control point information storage means 19. Therefore, movement amount determination means 15 determines the movement amount at the current viewpoint position from the movement amounts of the control points by interpolation.

In Step B6, movement amount determination means 15 determines the movement amount of the current viewpoint position by interpolation if it sandwiched between two control points. For example, it is assumed that current viewpoint position $E_n$ ($n^{th}$ viewpoint position) lies between control points $C_i$ and $C_{i+1}$, as shown in FIG. 16. It is assumed here that the movement amount (interpolated value) of the opacity curve at the current viewpoint position to be obtained is $m_n$ and len (p, q) is a function for obtaining the distance from point "p" to point "q" on the path. If the movement amount $m_n$ is to be obtained by a linear interpolation, the movement amount $m_n$ may be obtained in the following manner.

$$m_n = \frac{len(C_{i+1}, E_n)}{len(C_{i+1}, C_i)} m_i + \frac{len(C_i, E_n)}{len(C_{i+1}, C_i)} m_{i+1}$$

The interpolation of the movement amount is not limited to the linear interpolation, and a higher order interpolation may also be used. For example, the movement amount may be obtained by spline interpolation. In this case, the movement amount $m_n$ at the current viewpoint position may be obtained by the spline interpolation based on four control points before and after the viewpoint position, including two control points sandwiching the current viewpoint position $E_n$. When spline interpolation is used, a spline function that passes through four control points before and after the current viewpoint position is obtained with, for example, the distance from the starting point as a variable, and the movement amount $m_n$ is calculated by substituting the current viewpoint position to the spline function.

If the current viewpoint position is not sandwiched between two control points, movement amount determination means 15 may determine the movement amount of a control point closest to the current viewpoint position as the movement amount at the current viewpoint position. For example, if the viewpoint position lies on the path end side of the last control point viewed from the path starting point side, movement amount determination means 15 may determine the movement amount at the last control point as the movement amount at a current viewpoint position from the last control point to the end point of the path. Where the initial viewpoint position is located at a place different from the starting point of a path, and the starting point of the path is not a control point having no opacity value being set thereto, movement amount determination means 15 may determine the movement amount at the first control point as the movement amount of a current viewpoint position from the starting point of the path to the first control point.

In the present embodiment, several control points are set by control point setting means 18 and a lumen is made observable as a virtual endoscopic image at each control point. When the viewpoint position of the virtual endoscopic image differs from a control point, movement amount determination means 15 determines the movement amount at the current viewpoint position based on the movement amounts of opacity curves set at control points. In the present embodiment, if an appropriate opacity value is set at each control point, an opacity value estimated from the appropriate opacity values may be applied to a viewpoint position sandwiched between control points, whereby appropriate opacity setting may be expected at each viewpoint position. The present embodiment is particularly advantageous in the case in which virtual endoscopic images are generated while moving the viewpoint position along a path and the virtual endoscopic images are observed as a motion picture.

FIG. 17 illustrates a projection image generation apparatus according to a third embodiment of the present invention. Projection image generation apparatus 10b of the present embodiment includes, in addition to the configuration shown in FIG. 1, color map setting means 20. Other aspects are identical to those of the first embodiment. A color map which defines the relationship between the pixel value of three-dimensional data and display color and is used in volume rendering is set to virtual endoscopic image generation means 12. Note that a configuration that includes color map setting means 20 in addition to projection image generation apparatus 10a shown in FIG. 14 is also possible.

In the present embodiment, the color map is moved from a color map at the reference viewpoint position by an amount determined by movement amount determination means 15, as well as the opacity curve. When a virtual endoscopic image is generated by virtual endoscopic image generation means at a viewpoint position set by viewpoint position setting means, color map setting means 20 sets a color map obtained by moving a color map at a reference viewpoint position by a movement amount determined by movement amount determination means 15 to virtual endoscopic image generation means 12. When a viewpoint change is made, the reference viewpoint position may be the viewpoint position before the change, as in the opacity curve.

In the color map movement, color map setting means 20 translates the relationship between the pixel value and display color defined by the color map at the reference viewpoint position in a pixel value direction by a determined movement amount. More specifically, when the pixel values are represented by a variable "v", the color map at the reference viewpoint position is represented by $ClrM_{apD}(v)$, and the movement amount determined by movement amount determination means 15 is represented by "m", color map setting means 20 sets a color map represented by $ClrM_{ap}(v)=ClrM_{apD}(v-m)$ to virtual endoscopic image generation means 12.

In the present embodiment, when the opacity curve is moved according to the viewpoint position change, the color map is also moved in conjunction with the opacity curve movement. From the perspective of only visible or invisible, it is possible to visualize the interior of a lumen by moving the opacity curve according to the viewpoint position change. In the present embodiment, the color map is also moved, so that the present embodiment may provide an advantageous effect that the appearance of the interior of a lumen is improved when visualized, thereby providing more favorable display, in addition to the advantageous effects obtainable from the first embodiment.

In the first embodiment, when a viewpoint position change is made, the reference viewpoint position is the viewpoint position before the change, but not limited to this. For example, the initial viewpoint position may be used as the reference viewpoint position. In this case, movement amount determination means 15 may determine the movement amount based on the data distribution of an adjacent area of the initial viewpoint position and the data distribution of an adjacent area of the current viewpoint position. Opacity curve setting means 13 may set an opacity curve obtained by moving the opacity curve at the initial viewpoint position by the movement amount as the opacity curve at the current viewpoint position. In the method in which the viewpoint position before a viewpoint position change is used as the reference viewpoint position and the opacity curve is moved with reference to the opacity curve at the reference viewpoint position, opacity curves are obtained one after the other in conjunction with viewpoint position changes, so that errors may accumulate. In contrast, the method in which the reference viewpoint position is fixed to the initial viewpoint position may provide an advantageous effect of not accumulating errors.

In the second embodiment, the description has been made that the viewpoint positions are on a path, but they are not necessarily on a path. When a viewpoint position is not on a path, movement amount determination means 15 may obtain a corresponding point, which is closest to the viewpoint position, on the path, and the movement amount may be obtained by interpolation according to the distance between the corresponding point and control point. Further, control points are not necessarily present on a path. When a control point is not on a path, control point setting means 18 may obtain a corresponding point, which is closest to the control point, on the path and store the distance from the starting point of the path to the corresponding point to control point information storage means 19 as the position of the control point in the lumen.

In the second embodiment, the operation of the projection image generation apparatus for advancing the viewpoint position along a path toward the end point thereof has been described with reference to FIG. 15. The viewpoint position, however, may be advanced in any arbitrary direction, not just advancing one direction toward the end point of the path. Projection image generation apparatus 10a may reverse the viewpoint position advancing direction when, for example, an instruction to reverse the advancing direction is issued by the user and may generate virtual endoscopic images while moving the viewpoint position from the end point side to the starting point side of the path. Generation of virtual endoscopic images is not necessarily started from the starting point of a path, and it may be started at any arbitrary point. Further, if an arbitrary point away from a path is specified as a viewpoint position in the middle of moving the viewpoint along the path, projection image generation apparatus 10a may generate a virtual endoscopic image at the specified viewpoint position.

So far, the present invention has been described based on preferred embodiments, the projection image generation apparatus, method, and program is not limited to the embodiments described above, and it will be appreciated that modifications and alterations made to the disclosed embodiments are included in the scope of the prevent invention.

What is claimed is:

1. A projection image generation apparatus, comprising:
   a virtual endoscopic image generator that generates, based on three dimensional data representing an interior of a subject having a lumen captured by an imaging device, a virtual endoscopic image, which is a pseudo three dimensional image, for visualizing an interior of the lumen by volume rendering;
   an opacity curve setter that sets, in the virtual endoscopic image generator, an opacity curve which defines a relationship between pixel values of the three dimensional data and opacity values and is used in the volume rendering;
   a viewpoint position setter that sets a viewpoint position corresponding to a camera position of the virtual endoscopic image within the interior of the lumen in the virtual endoscopic image generator, and is capable of setting different viewpoints in the extension direction of the lumen; and
   a movement amount determination device that determines a movement amount of the opacity curve for the viewpoint position set by the viewpoint position setter with respect to the opacity curve at a reference viewpoint position in the case that the viewpoint position set by the viewpoint position setter is changed in the extension direction of the lumen from the reference viewpoint position, after the change in the viewpoint position, wherein a viewpoint position change is made by the viewpoint position setter, the opacity curve setter automatically moves the opacity curve at the reference viewpoint position by the movement amount determined by the movement amount determination device for the viewpoint position after the change, and sets the moved opacity curve in the virtual endoscopic image generator.

2. The projection image generation apparatus of claim 1, wherein the opacity curve setter translates a relationship between pixel values and opacity values defined by the opacity curve at the reference viewpoint position in a pixel value direction by the determined movement amount.

3. The projection image generation apparatus of claim 1, wherein, when pixel values are represented by a variable "v", the opacity curve at the reference viewpoint position is represented by $O_D(v)$, and the movement amount determined by the movement amount determination device is represented by "m", the opacity curve setter sets an opacity curve represented by $O(v)=O_D(v-m)$ in the virtual endoscopic image generation device.

4. The projection image generation apparatus of claim 1, wherein the reference viewpoint position is a predetermined initial viewpoint position.

5. The projection image generation apparatus of claim 1, wherein, when a viewpoint position change is made by the viewpoint position setter, the reference viewpoint position is the viewpoint position before the change.

6. The projection image generation apparatus of claim 1, wherein the movement amount determination device determines the movement amount based on a data distribution of the three-dimensional data in an adjacent area of the reference viewpoint position and a data distribution of the three-dimensional data in an adjacent area of the viewpoint position set by the viewpoint position setter.

7. The projection image generation apparatus of claim 1, wherein the movement amount determination device determines the movement amount by performing matching between a histogram representing a data distribution of the three-dimensional data in an adjacent area of the reference viewpoint position and a histogram representing a data distribution of the three-dimensional data in an adjacent area of the viewpoint position set by the viewpoint position setter.

8. The projection image generation apparatus of claim 7, wherein, when the histogram of pixel values of the three-dimensional data in an adjacent area of the reference viewpoint position is $H_D(v)$ with the pixel values being represented by a variable "v" and the histogram of pixel values of the three-dimensional data in an adjacent area of the viewpoint position set by the viewpoint position setter is $H_n(v)$ with the pixel values being represented by the variable "v", the movement amount determination device calculates a similarity degree between a histogram represented by $H_D(v-x)$ and the histogram $H_n(v)$ by changing the value of "x" and determines a value of "x" when the similarity degree becomes maximum as the movement amount.

9. The projection image generation apparatus of claim 7, wherein, when the histogram of pixel values of the three-dimensional data in an adjacent area of the reference viewpoint position is $H_D(v)$ with the pixel values being represented by a variable "v", the histogram of pixel values of the three-dimensional data in an adjacent area of the viewpoint position set by the viewpoint position setter is $H_n(v)$ with the pixel values being represented by the variable "v", and P(H(v)) is a function for obtaining a peak position in histogram H(v), the movement amount determination device determines a value of "x" obtained by $x=P(H_D(v))-P(H_n(v))$ as the movement amount.

10. The projection image generation apparatus of claim 4, wherein:

the apparatus further comprises a control point setter that sets one or more control points in the lumen, setting an opacity curve for each control point by translating the opacity curve at the initial viewpoint position in a pixel value direction, and storing a location of each control point in the lumen and a movement amount from the opacity curve at the initial viewpoint position associated with each other as control point information; and the movement amount determination device obtains an estimated value of movement amount at the viewpoint position set by the viewpoint position setter from the opacity curve at the initial viewpoint position based on the location of the viewpoint position in the lumen set by the viewpoint position setter, and the location of a control point in the lumen and the movement amount from the opacity curve at the initial viewpoint position included in the control point information.

11. The projection image generation apparatus of claim 10, wherein the apparatus further comprises a path setter that sets a path in the lumen, and the locations of the viewpoint position and each control point in the lumen are represented by distances from a starting point of the path.

12. The projection image generation apparatus of claim 10, wherein:

the control point setter sets two or more control points; and the movement amount determination device obtains, when the viewpoint position set by the viewpoint position setter is located between two control points in the lumen, an estimated value of movement amount at the viewpoint position set by the viewpoint position setter by interpolation based on the movement amount of each of at least the two control points.

13. The projection image generation apparatus of claim 1, wherein:

the apparatus further comprises a color map setter that sets a color map which defines the relationship between pixel values of the three-dimensional data and display colors, and is used in the volume rendering; and when a viewpoint position change is made by the viewpoint position setter the color map setter automatically moves a color map at the reference viewpoint position by the movement amount determined by the movement amount determination device for the viewpoint position after the change, and sets the moved color map in the virtual endoscopic image generator.

14. The projection image generation apparatus of claim 13, wherein the color map setter translates the relationship between pixel values and display colors defined by the color map at the reference viewpoint position in a pixel value direction by the determined movement amount.

15. The projection image generation apparatus of claim 13, wherein, when the pixel values are represented by a variable "v", the color map at the reference viewpoint position is represented by $ClrM_{apD}(v)$, and the movement amount determined by the movement amount determination device is represented by "m", the color map setter sets a color map represented by $ClrM_{ap}(v)=ClrM_{apD}(v-m)$ to the virtual endoscopic image generator.

16. A projection image generation method, comprising using a computer to perform the steps of:

generating based on three-dimensional data representing an interior of a subject having a lumen captured by an imaging device, a virtual endoscopic image, which is a pseudo three-dimensional image, for visualizing an interior of the lumen by volume rendering; and displaying the virtual endoscopic image on a display, wherein when a viewpoint position of the virtual endoscopic image, which corresponds to a camera position of the virtual endoscopic image within the interior of the lumen and is capable of setting different viewpoints in the extension direction of the lumen, is changed, an opacity curve defines a relationship between pixel values of the three-dimensional data and opacity values, and is used in the volume rendering, is automatically moved from the opacity curve at a reference viewpoint position in the case that the viewpoint position set by the viewpoint position setter is changed in the extension direction of the lumen from the reference viewpoint position, after the change in the viewpoint position in accordance with the change of the viewpoint position and the moved opacity curve is used to generate the virtual endoscopic image at the viewpoint position after the change.

17. The projection image generation method of claim 16, wherein the movement of the opacity curve is implemented by determining a movement amount for a viewpoint position at which a virtual endoscopic image is to be generated from the opacity curve at the reference viewpoint position, and moving the opacity curve by the determined movement amount.

18. The projection image generation method of claim 17, wherein the movement amount of the opacity curve is determined based on a data distribution of the three-dimensional data in an adjacent area of the reference viewpoint position and a data distribution of the three-dimensional data in an adjacent area of the viewpoint position at which a virtual endoscopic image is to be generated.

19. The projection image generation method of claim 17, wherein:

before generating the virtual endoscopic image, one or more control points are set in the lumen, a movement amount of the opacity curve for each control point is set, and a location of each control point in the lumen and the movement amount of the opacity curve are associated with each other and stored as control point information; and the movement amount of the opacity curve is determined by obtaining an estimated value of movement amount for an opacity curve at the viewpoint position at which a virtual endoscopic image is to be generated based on the location of the viewpoint position in the lumen at which a virtual endoscopic image is to be generated, and the location of a control point and the movement amount of the opacity curve included in the control point information.

20. A non-transitory computer readable recording medium on which is recorded a program for causing a computer to perform the step of generating, based on three-dimensional data representing an interior of a subject having a lumen captured by an imaging device, a virtual endoscopic image within an interior of the lumen and is capable of setting different viewpoints in the extension direction of the lumen, which is a pseudo three-dimensional image, for visualizing the interior of the lumen by volume rendering, wherein the program causes the computer to perform the step of moving an opacity curve which defines the relationship between pixel values of the three-dimensional data and opacity values, and is used in the volume rendering from an opacity curve at a reference viewpoint position in the case that the viewpoint position is changed in the extension direction of the lumen from the reference viewpoint position, after the change in the viewpoint position, and corresponding to a camera position of the virtual endoscopic image, and setting the moved opacity curve as the opacity curve used for generating the virtual endoscopic image.

* * * * *